United States Patent
Kim

(10) Patent No.: US 8,254,299 B2
(45) Date of Patent: Aug. 28, 2012

(54) MULTIMEDIA BROADCAST/MULTICAST SERVICE CELLS RECONFIGURATIONS

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 1094 days.

(21) Appl. No.: 11/909,714

(22) PCT Filed: Mar. 29, 2006

(86) PCT No.: PCT/KR2006/001145
§ 371 (c)(1),
(2), (4) Date: Sep. 25, 2007

(87) PCT Pub. No.: WO2006/104346
PCT Pub. Date: Oct. 5, 2006

(65) Prior Publication Data
US 2010/0165901 A1 Jul. 1, 2010

Related U.S. Application Data

(60) Provisional application No. 60/666,747, filed on Mar. 29, 2005.

(30) Foreign Application Priority Data

Nov. 8, 2005 (EP) .................................... 05292365

(51) Int. Cl.
*H04H 20/21* (2006.01)
(52) U.S. Cl. .................. 370/312; 370/324; 370/350
(58) Field of Classification Search .............. 370/312, 370/324, 350
See application file for complete search history.

(56) References Cited

U.S. PATENT DOCUMENTS

| 6,449,488 | B1 | 9/2002 | Cheng et al. | |
|---|---|---|---|---|
| 6,452,644 | B1 | 9/2002 | Shimakawa et al. | |
| 7,373,148 | B2 * | 5/2008 | Kim et al. | 455/437 |
| 2003/0157949 | A1 * | 8/2003 | Sarkkinen et al. | 455/503 |
| 2003/0157953 | A1 | 8/2003 | Das et al. | |
| 2004/0087320 | A1 | 5/2004 | Kim et al. | |
| 2004/0103435 | A1 | 5/2004 | Yi et al. | |

(Continued)

FOREIGN PATENT DOCUMENTS

EP 1467586 A 10/2004

(Continued)

OTHER PUBLICATIONS

3GGP: Universal Mobile Telecommunications System (UMTS); Radio Resource Control (RRC) protocol specification (3GPP TS 25.331 version 6.4.0 Release 6) ETSI TS 125.331, Dec. 2004, p. 1,3,12,13,15, 350-358, 371, 387-399, 480.

(Continued)

*Primary Examiner* — David Oveissi
(74) *Attorney, Agent, or Firm* — Lee, Hong, Degerman, Kang & Waimey

(57) ABSTRACT

The invention proposes a method for indicating the validity of physical channels of a control cell and a neighboring cell carrying point-to-multipoint service data in a wireless communication system. The method includes the following steps: generating a message comprising configuration information for each of said channels; including validity information with the message for deriving the validity timing of the configuration information for each of said channels; and transmitting the message to a mobile terminal (10) through the control cell. The invention also proposes a mobile equipment (10) and a Radio Network Controller (111), respectively adapted to implement the above method.

22 Claims, 12 Drawing Sheets

U.S. PATENT DOCUMENTS

2005/0090278 A1*  4/2005  Jeong et al. .............. 455/525
2005/0249140 A1  11/2005  Lee
2005/0249141 A1  11/2005  Lee
2006/0104255 A1*  5/2006  Kido et al. .............. 370/345

FOREIGN PATENT DOCUMENTS

| | | |
|---|---|---|
| JP | 09-037342 | 2/1997 |
| JP | 2004-007418 | 1/2004 |
| JP | 2005-323113 | 11/2005 |
| RU | 2157598 | 10/2000 |
| RU | 99106402 | 2/2001 |
| WO | 9908457 | 2/1999 |
| WO | 2004-017541 | 2/2004 |

OTHER PUBLICATIONS

3GPP TS 25.331 version 6.4.0 Release 6 ETSI TS 125.331, Dec. 2004, pp. 119, 261-262, 403-404.

* cited by examiner

US 8,254,299 B2

MULTIMEDIA BROADCAST/MULTICAST SERVICE CELLS RECONFIGURATIONS

CROSS-REFERENCE TO RELATED APPLICATIONS

This application is a PCT filing of international Application No. PCT/KR2006/001145, filed on Mar. 29, 2006, which claims the benefit of earlier filing date and right of priority to EP Application No. 05292365.3, filed on Nov. 8, 2005 and to U.S. Provisional Application No. 60/666/747, filed on Mar. 29, 2005.

TECHNICAL FIELD

The present invention is related to transmitting control information from a network to a mobile terminal in a wireless communication system, and more particularly, to indicating the validity of a physical channel configuration.

BACKGROUND ART

The following acronyms may be used throughout the description:
BCCH (Broadcast Control Channel), BCH (Broadcast Channel), BMC (Broadcast/Multicast Control), CB (Cell Broadcast), CCCH (Common Control Channel), CN (Core Network), CRNC (Controlled Physical Channel Reconfiguration), CS (Circuit Switched), CTCH (Common Traffic Channel), DCCH (Dedicated Control Channel), DCH (Dedicated Channel), DPCH (Dedicated Physical Channel), DPDSCH (Dedicated Physical Downlink Shared Channel), DSCH (Downlink Shared Channel), DTCH (Dedicated Traffic Channel), EIR (Equipment Identify Register), FACH (Forward Access Channel), FDD (Frequency Division Combining), GGSN (Gateway GPRS Support Node), GMSC (Gateway Mobile Switching Center), GPRS (General Packet Radio Service), HFN (Hyper Frame Number), HSS (Home Subscriber Server), MAC (Medium Access Control), MBMS (Multimedia Broadcast/Multicast Service), MCCH (MBMS point-to-multipoint Control Channel), MGW (Media Gateway), MIB (Master Information Block), MICH (MBMS Notification Indicator Channel), MSC (Mobile Switching Centre), MSCH (MBMS Scheduling Channel), MTCH (MBMS point-to-multipoint Traffic Channel), OSI (Open System Interconnection), PCCH (Paging Control Channel), PCCPCH (Primary Common Control Physical Channel), PCPICH (Primary Common Pilot Channel), PDCP (Packet Data Convergence Protocol), PDSCH (Physical Downlink Shared Channel), PDU (Protocol Data Unit), PICH (Paging Indicator Channel), PLMN (Public Land Mobile Network), PMM (Packet Mobility Management), PS (Packet Switched), PSTN (Public Switched Telephone Network), PtM (Point-to-multipoint transmission), RAB (Radio Access Bearer), RACH (Radio Access Channel), RAN (Radio Access Network), RAT (Radio Access Technology), RLC (Radio Link Control), RNC (Radio Network Controller), RNS (Radio Network Sub-systems), RRC (Radio Resource Control), SAP (Service Access Point), SCCH (Shared Control Channel), SCCPCH (Secondary Common Control Physical Channel), SDU (Service Data Unit), SFN (System Frame Number), SGSN (Serving GPRS Service Node), SIB (System Information Block), SN (Sequence Number), SRNC (Serving Radio Network Controller), TDD (Time-Division Duplexing), TTI (Transmission Time Interval), UE (User Equipment), UTRAN (UMTS Terrestrial Radio Access), W-CDMA (wideband code division multiple access).

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal or user equipment UE 10, a UTRAN 100 and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111 through an Iub interface. The RNC 111 handles the assigning and managing of radio resources, and operates as an access point with respect to the core network 200. RNCs 111 can be connected together via the Iur interface.

The Node-Bs 112, 113 receive information sent by the physical layer of the terminal 10 through an uplink, and transmit data to the terminal 10 through a downlink The Node-Bs 112, 113, thus operate as access points of the UTRAN 100 for the terminal 10. Each Node-B controls one or several cells, each being characterised by the coverage of a given geographical area on a given frequency.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching centre (MSC) 210 and a Media Gateway MGW 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

Various types of interfaces exist between network components to allow the network components to transmit and receive information to and from each other for mutual communication therebetween. An interface between the RNC 111 and the core network 200 is defined as an Iu interface. Each RNC is connected via the interface Iu to the core network 200. In particular, the Iu interface between the RNCs 111 and the core network 200 for packet switched systems is defined as Iu-PS, and the Iu interface between the RNCs 111 and the core network 200 for circuit switched systems is defined as Iu-CS.

For supporting circuit switched services, the RNCs 111 are connected to the MSC 210 of the core network 200, and the MSC 210 is connected to the Media Gateway (MGW) 220 which manages the connection with other networks via the interface Nb. The MGW 220 may be connected to the Public Switched Telephone Network (PSTN) in order to adapt codecs between the PSTN and the connected Radio Access Network. For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet, via the interface Gi. The GGSN 240 notably handles the routing, the charging and the separation of data flows into different Radio Access Bearers RAB. The SGSN is connected via the GS interface to the MSC and via the GN interface to the GGSN. The SGSN 230 is connected by respective interfaces to an EIR and to a HSS (not illustrated). The MSC 210 is connected by respective interfaces to the EIR and the HSS. The MGW 220 is connected by an interface to the HSS. The GGSN is connected by an interface to the HSS. The EIR hosts lists of mobiles which are allowed or not to be used on the network. The HSS handles the subscription data of the users.

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane UP for transmitting user data and a control plane CP for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels. The MAC layer provides an allocation service of the MAC parameters for allocation and reallocation of radio resources. The MAC layer is connected to an upper layer called the radio link control (RLC) layer, via a logical channel.

Various logical channels are provided according to the kind of transmitted information. In general, when information of the control plane is transmitted, a control channel ctrl is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or MBMS service) refers to a method of providing streaming or background services to a plurality of UEs using a downlink-dedicated MBMS radio bearer that utilizes at least one of point-to-multipoint and point-to-point radio bearer. MBMS is introduced in the UMTS standard in the Release 6 of the specification. It describes techniques for optimised transmission of MBMS bearer service in UTRA such as point-to-multipoint transmission, selective combining and transmission mode selection between point-to-multipoint and point-to-point bearer. This is used in order to save radio resources when the same content is sent to multiple users, and enables TV-like services. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For the purposes of MBMS, additional traffic and control channels exist. For example, an MCCH (MBMS point-to-multipoint Control Channel) is used for transmitting MBMS control information, an MTCH (MBMS point-to-multipoint Traffic Channel) is used for transmitting MBMS service data and an MSCH is used to transmit scheduling information. The MCCH schedule is common for all services.

The different logical channels that exist are listed below:

For the control channel CCH: BCCH, PCCH, DCCH, CCCH, SHCCH and MCCH. For the Traffic channel TCH: DTCH, CTCH and MTCH.

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). The MAC-m sublayer may handle the MBMS data.

Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a CB message, hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, with a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods. Additionally, the RRC handles user mobility within the Radio Access Network, and additional services like location services.

The different possibilities that exist for the mapping between the radio bearers and the transport channels are not always possible. The UE/UTRAN deduces the possible mapping depending on the UE state and the procedure that the UE/UTRAN is executing. Different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signalling exchange between the RNC and the UE.

In the following description, the start and the reconfiguration of a S-CCPCH carrying MTCH is described. The stop of a service can be considered as a special reconfiguration, i.e. the S-CCPCH has a null configuration.

According to the background art, when the UE reads the configuration of a service which is sent in PtM mode, the UE supposes this configuration is valid immediately. The UE receives the list of services that are active at the moment in one of the two messages; MBMS Unmodified services Information or in the message MBMS Modified services Information. These messages indicate that UEs that want to receive this service should perform a specific action, for example acquire information for counting purposes, acquire information for the configuration of the PtM radio bearer, establish a PMM connection, stop receiving the PtM radio bearer etc. On the network side, when the configuration is changed for a given service, the new configuration is indicated on the MCCH one modification period in advance in the MBMS Modified services Information message indicating that the UE shall acquire information for the configuration of the PtM radio bearer, so that UEs can receive the reconfigured channel from the beginning. Thus, there is a delay between the configuration taken into account by the UE and its effective use by the network.

Such a configuration protocol is illustrated at FIG. 10 for a single cell. In this case, a service starts in the current cell (the current cell is the control cell, i.e. the cell of which is taken into account the MCCH by the UE) and does not generate any configuration problem: indeed, the timing offset between the MTCH and the MCCH (due to a different Timing offset when they are mapped on different S-CCPCHs) remains the same. However, it is not clear which frame will be considered when the modification period of the MCCH is not completely aligned on the frame boundaries of the S-CCPCH carrying MTCH.

The case with an ongoing reconfiguration illustrated at FIG. 11, generates more problems. During the Modification Period 1, the PtM configuration S1 of the Service S of cell A is sent on the MCCH as unmodified service. At the same time, the service S is sent on the cell A with the configuration S1. The UTRAN wants to change the configuration from S1 to S2. Therefore, the UTRAN broadcasts the new configuration S2 of the S-CCPCH carrying service S on the MCCH during the modification period 2 as a modified service. During the modification period 2, the MTCH carrying the service S still uses the configuration S1. But at a given frame during modification period 2, the UE will start using configuration S2. In the Modification period 3 the MCCH is used to broadcast the configuration S2 as unmodified service. Thus, until the beginning of the modification period 3, the UE will use a wrong configuration for the MCCH.

In the case a reconfiguration is ongoing and a UE starts to receive the MCCH during the modification period 2 where the new configuration is broadcast on the MCCH, the UE is not able to know about the configuration of the MTCH during the current modification period. Also, the UE is not able to receive the MTCH correctly during this period.

In order to increase the coverage, a UE which is located between different cells can receive the same MBMS services from different cells at the same time, and combine the received information as shown in FIG. 9. In this case, the UE reads the MCCH from one control cell that it has selected, this cell being named the control cell in the remainder of the description.

In the background art, there is no restriction for the alignment of the MCCHs of these cells. This implies that the modification period of MCCHs of neighbouring cells (a control cell and one of its neighbouring cells for instance) can be different, and also that the start of each modification period in neighbouring cells can be different. This occurs naturally due to the clock drift of different NodeBs, e.g. one NodeB will advance faster as another NodeB.

In order to maintain synchronisation between different services of the transmission of MTCH, the clock drift between two NodeBs can in general be easily adjusted by the RNC that is responsible for the scheduling of the S-CCPCHs by inserting an empty TTI from time to time when the time difference for the latest NodeB compared to the most advanced NodeB passes above one TTI, as illustrated at FIG. 12. However, for the synchronisation of the modification periods of the MCCH there is no easy solution, since the scheduling of the MCCH transmission is related to the System frame number (SFN, broadcast on the BCH) of each cell.

If the configuration of a service in a neighbouring cell changes, this change is aligned with the modification period of the MCCH of this neighbouring cell. However, the modification period of the neighbouring cell will not necessarily be aligned with the modification period of the cell that the UE is currently reading the MCCH from. This means that in the case the UE receives the information on the change of the configuration of a service of a neighbouring cell, it has no means for determining when this change will become active, since the offset (and the modification period) of the neighbouring cell is not aligned.

DISCLOSURE OF INVENTION

Technical Solution

Thus, there is a need for a solution that improves the service reconfiguration timing for a user equipment receiving a MBMS service from neighbouring cells. One aspect of the present invention involves the recognition by the present inventors of the drawbacks in the related art as explained above. In order to address such problems, the present invention proposes the following:

The invention proposes a method for indicating the validity of physical channels of a control cell and a neighbouring cell carrying point-to-multipoint service data in a wireless communication system, the method comprising the following steps:
- generating a message comprising configuration information for each of said channels;
- including validity information with the message for deriving the validity timing of the configuration information for each of said channels; and
- transmitting the message to a mobile terminal through the control cell.

The point-to-multipoint service data may comprise Multimedia Broadcast Multicast Service (MBMS) data.

The message may contain a neighbouring cell configuration validity timing related to a control cell system timing transmitted to the mobile terminal.

The validity information may define a neighbouring cell configuration information validity timing based on a reference to the control cell System Frame Number.

The reference to the control cell System Frame Number does preferably not include at least one of the most significant bits of the System Frame Number coding.

The validity information may be included in a MBMS Modified Services Information or a MBMS Unmodified Services Information control message transmitted on the MCCH of the control channel.

The message may define a modification period at the start of which a configuration information becomes valid.

The message may define a time offset relative to the beginning of a modification period.

The message may define the time offset with a number representative of a number of frames or Time Transmission Intervals.

The validity information may comprise the currently valid configuration information and the next valid configuration information in case the configuration information of the neighbouring cell is changed.

The currently valid configuration information and the next valid configuration information may be associated respectively to a beginning of validity timing and to an end of validity timing.

The currently valid configuration may be associated to a flag indicating that this configuration may be used immediately.

The invention also proposes a method for adapting the configuration of physical channels set by a user equipment with a control cell and a neighbouring cell carrying point-to-multipoint service data in a wireless communication system, the method comprising the following steps:
- receiving a message comprising configuration information for each of said channels and validity information for deriving the validity timing of the configuration information for each of said channels;
- determining respective timing starting from which the configuration information of each of said channels is valid based on the validity information;
- starting from said timing, receiving the channels using the valid configuration.

The point-to-multipoint service data may comprise Multimedia Broadcast Multicast Service (MBMS) data.

The received message may contain a neighbouring cell configuration validity timing related to a control cell system timing transmitted to the mobile terminal.

The validity information may define a neighbouring cell configuration information validity timing based on a reference to the control cell System Frame Number.

The reference to the control cell System Frame Number does preferably not include at least one of the most significant bits of the System Frame Number coding.

The validity information may be included in a MBMS Modified Services Information or a MBMS Unmodified Services Information control message transmitted on the MCCH of the control channel.

The message may define a modification period at the start of which a configuration information becomes valid.

The message may define a time offset relative to the beginning of a modification period.

The validity information may comprise the currently valid configuration and the next valid configuration in case the configuration of the neighbouring cell is changed.

The currently valid configuration and the next valid configuration may be associated respectively to a beginning of validity timing and to an end of validity timing.

The currently valid configuration may be associated to a flag indicating that this configuration information may be used immediately.

The invention also proposes a mobile equipment, comprising:
- a reception module:
  - adapted to receive physical channels carrying point-to-multipoint service data from a control cell and from a neighbouring cell belonging to a wireless communication system; and
  - adapted to change the physical channel configuration at a given time moment;
- a processing module:
  - adapted to extract configuration information associated to the physical channels and configuration validity information from a message transmitted by a control cell; and
  - adapted to derive the validity timing of the configuration information based on the configuration validity information;
  - adapted to generate a command defining a physical channel configuration change at a given moment and to provide it to the reception module.

The invention also proposes a radio network controller, comprising:
- a module for:
  - generating a message comprising configuration information for physical channels of cells intended to be used respectively as a control cell and a neighbouring cell, these physical channels being foreseen for carrying point-to-multipoint service data in a wireless communication system;
  - including validity information with the message based on which the validity timing of the configuration information may be derived for each of said channels; and
- an interface adapted to provide the message to a control cell.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

MODE FOR THE INVENTION

Figure 1:
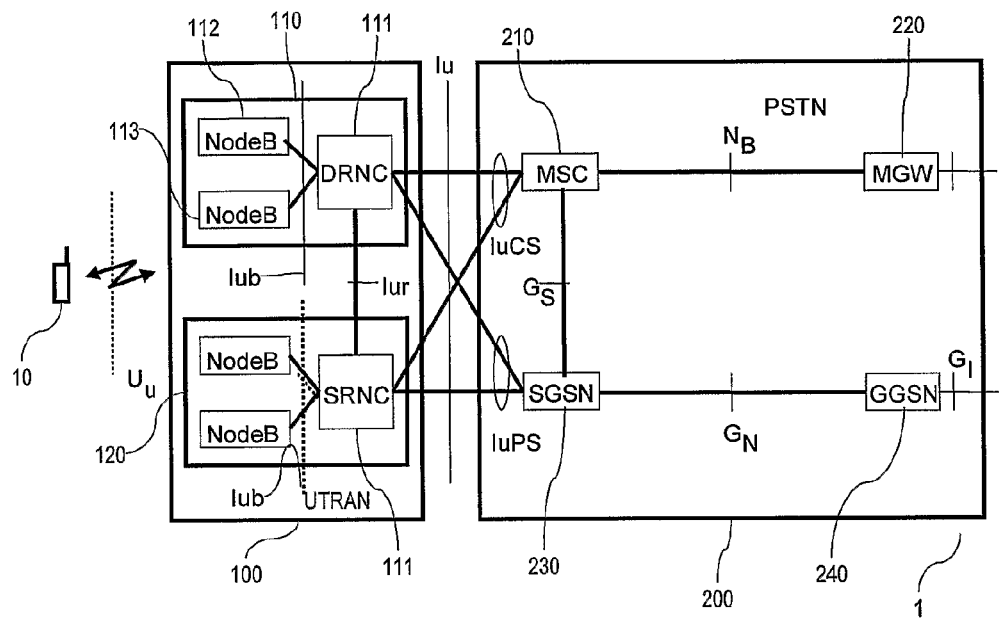
FIG. 1 is a block diagram of a general UMTS network architecture.
Figure 2:
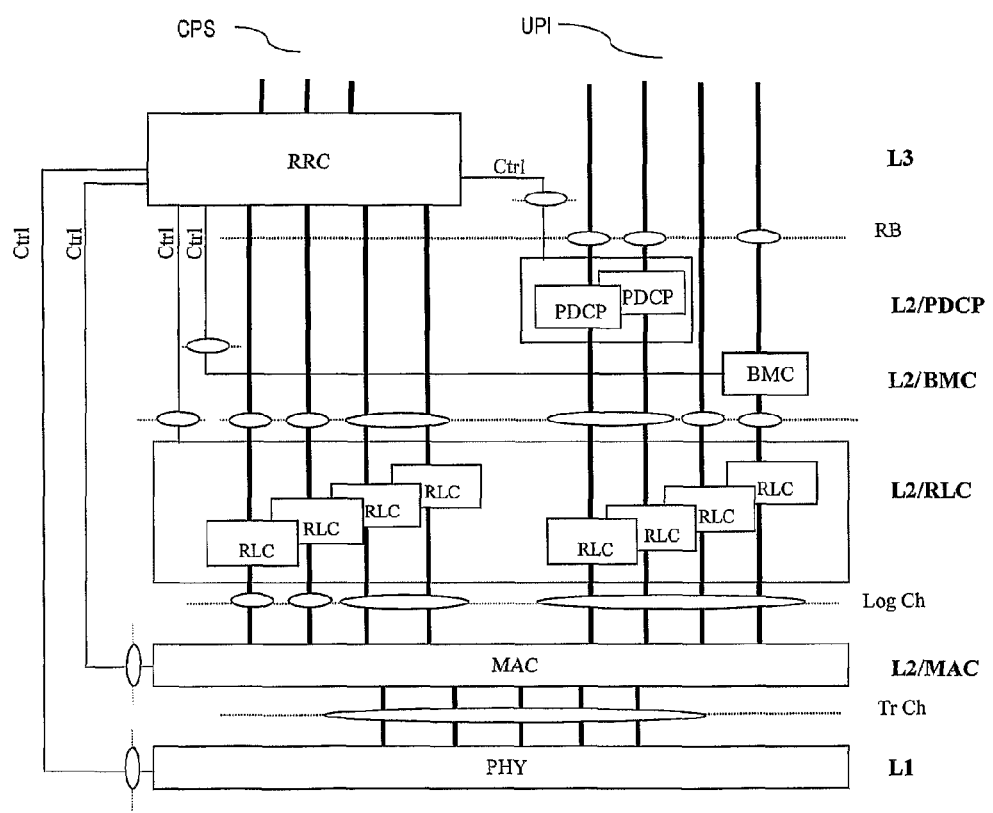
FIG. 2 is a block diagram of a structure of a radio interface protocol between a terminal and a network based on 3GPP radio access network standards.
Figure 3:
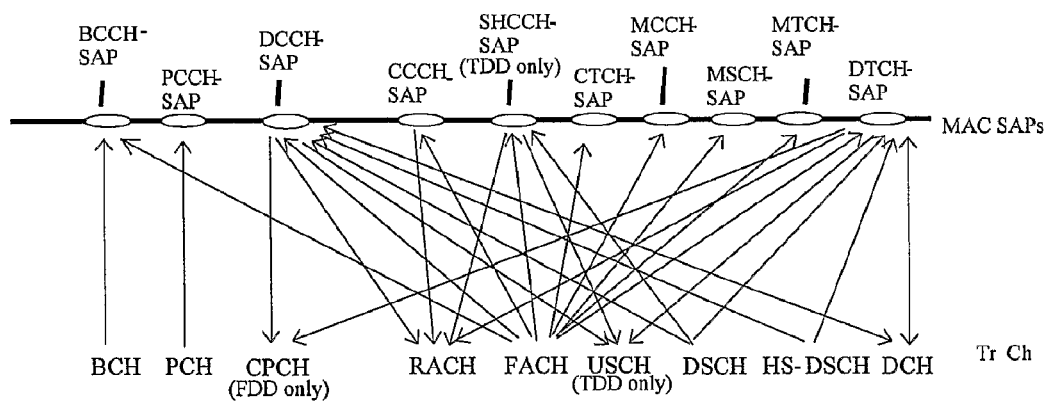
FIG. 3 illustrates the mapping of logical channels onto transport channels in the mobile terminal.
Figure 4:
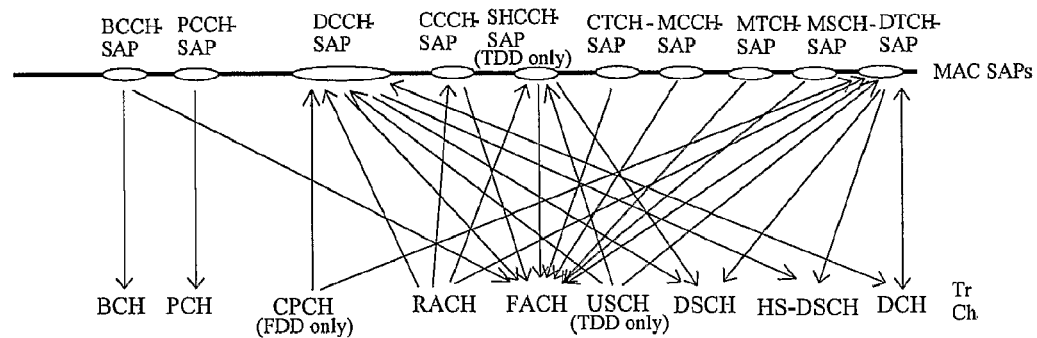
FIG. 4 illustrates the mapping of logical channels onto transport channels in the network.

The RLC layer (Radio Link Control) is a layer 2 protocol which is used in order to control the data exchange between the logical channels of the RNC and the UE. The RLC layer can currently be configured in 3 types of transfer modes: the transparent mode, the unacknowledged mode and the acknowledged mode. The detailed behaviour of these modes is described in the document named, Radio Link Control (RLC) protocol specification under the reference 3GPP TS 25.322. The different functionalities that are available depend on the transfer mode.

In acknowledged and unacknowledged mode, SDUs (service data units) can be split into smaller PDUs (protocol data units) that are used for transmission over the air interface. The transmitter side separates the SDUs into PDUs, and, based on control information that is added to the PDUs, the receiver side re-assembles the PDUs in order to reconstruct the SDUs. Such control information is, for example, a PDU sequence number for detecting whether a PDU has been lost or a Length Indicator (LI) that indicates the beginning/end of an SDU within an RLC PDU.

In unacknowledged mode (UM) the receiver does not send a confirmation to the transmitter of correctly received PDUs, but the receiver side just reassembles PDUs to SDUs based on signalling information contained in the PDUs and transfers the complete SDUs to higher layers.

In acknowledged mode (AM), the receiver sends acknowledgements for the correctly received PDU. The transmitter uses these acknowledgements in order to initiate retransmissions of missing PDUs. The acknowledgements are sent in certain conditions. Several mechanisms are used to initiate the transmission of the acknowledgements for PDUs received by the receiver. The choice of the activated mechanisms is defined in the standard and/or configured by RRC signalling. One example for such a mechanism for the transmission of a status PDU is for example the reception of a PDU with a sequence number that does not correspond to the latest received sequence number increased by one, or when the receiver receives an indication from the transmitter in the RLC control information that an acknowledgment (also called Status) should be sent. The indication of the transmitter to send a status PDU is called Polling.

When the transmitter sends a Polling bit, a mechanism is defined in the UMTS standard if no Status report has been received after the transmission of the polling after a certain time. According to this mechanism, the transmitter retransmits a PDU including the polling indicator and is called a timer poll.

Another mechanism counts the number of retransmissions of a PDU. In the case the retransmission exceeds a certain number (MaxDat) the transmitter starts the reset procedure. The reset procedure is a procedure that allows to set the transmitter and the receiver entity of a radio bearer using AM RLC mode to an initial state. When the Reset procedure is initiated, the initiating entity transmits a Reset PDU to the terminating entity. The terminating entity acknowledges the reception of the Reset PDU by transmitting the Reset Ack PDU. If the initiating entity has not received the Reset Ack PDU after a certain time, the initiating entity retransmits the Reset PDU. If the initiating entity has not received a Reset Ack PDU after a certain amount of retransmissions, the initiating entity detects an unrecoverable error.

This example describes the situation where a dysfunction is detected in the operation of an RLC entity in RLC AM mode. Other mechanisms to detect a dysfunction are possible, are already described in the UMTS standard, or possible to be imagined and implemented. It is also possible to imagine detection mechanisms for RLC entities in UM mode, which would for example detect that undefined signalling information is included in the RLC PDU, or where higher layers detect that the reception/transmission of the UM entity is not behaving correctly.

Other mechanisms can detect an unrecoverable error, which can correspond to a blocked situation, or a situation where the communication is disturbed.

If the UE detects an unrecoverable error situation as described in the standard, the UE enters CELL_FACH state and sends a Cell update message to the NodeB/RNC eventually indicating that an unrecoverable error has occurred by setting the Information Element (IE) Cell update cause to the cause RLC unrecoverable error. The UE indicates by including the IE AM_RLC error indication (RB2, RB3 or RB4) that this unrecoverable error has either occurred for one of the SRBs with the Ids 2, 3 or 4. By including the IE AM_RLC error indication (RB>4), the UE indicates that this error has occurred for one of the RBs using RLC AM mode with Ids higher than 4. The RNC can then send the Cell Update Confirm message and indicate that the RLC entities for SRBs with the Ids 2, 3 and 4, or for the RBs with Ids higher than 4 that use RLC AM mode shall be re-established by setting the IE RLC re-establish indicator (RB2, RB3 and RB4) and/or RLC re-establish indicator (RB5 and upwards) to true.

The UM/AM RLC entity is also responsible for handling of ciphering and deciphering. In order to do so, the RLC entity in the transmitter and the receiver maintain a COUNT-C number, which is composed of a Hyper frame number (IIFN) and the RLC sequence number (SN). The COUNT-C value, together with other information, is used as input to a mathematical function that generates a bitstring. This bitstring and the RLC PDU except the SN are combined by the logical XOR operation, which ensures the ciphering of the data part of the RLC PDU. The HFN value is incremented each time the RLC SN wraps around (i.e. when the RLC SN reaches its highest value and restarts from 0). In the case the receiver misses a certain number of SNs, or in the case the SN received has been altered during the reception, the COUNT-C in the receiver and the transmitter may be desynchronized. In this case, the receiver is not able to decipher correctly the information received. The receiver can detect the dysfunction of the deciphering entity by different mechanisms.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because a RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

Figure 5:
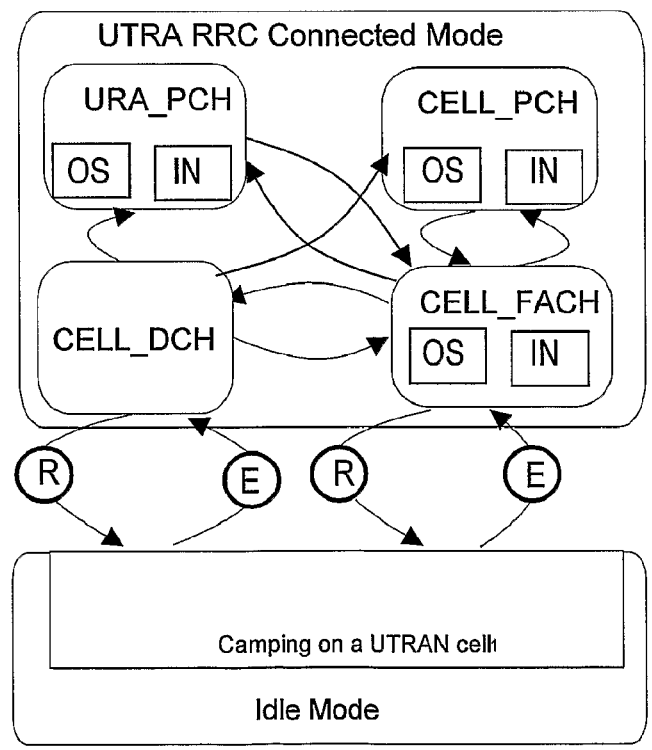
FIG. 5 illustrates examples of states and mode transitions in a UE.

In contrast, the UTRAN cannot determine the existence of a terminal in idle mode. The existence of idle mode terminals can only be determined by the core network to be within a region that is larger than a cell, for example a location or a routing area. Therefore, the existence of idle mode terminals is determined within large regions and, in order to receive mobile communication services such as voice or data, the idle mode terminal must move or change into the RRC connected mode. The possible transitions between modes and states of a user equipment are shown in FIG. 5. OS stands for Out of service, IN stands for In service, R stands for a step of releasing an RRC connection and E stands for a step of establishing an RRC connection.

A UE in RRC connected mode can be in different states, for example CELL_FACH state, CELL_PCH state, CELL_DCH state or URA_PCH state, other states being possible. Depending on the states the UE carries out different actions and listens to different channels. For example a UE in CELL_DCH state will try to listen (amongst others) to DCH type of transport channels which comprises DTCH and DCCH transport channels and which can be mapped to a certain DPCH, DPDSCH, or other physical channels. The UE in CELL_FACH state will listen to several FACH transport channel which are mapped to a certain S-CCPCH, the UE in PCH state will listen to the PICH channel and to the PCH channel which is mapped to a certain S-CCPCH physical channel.

The main system information is sent on the BCCH logical channel which is mapped on the P-CCPCH (primary Common Control Physical Channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e. via the P-CCPCH), then in each frame or set of two frames, the SFN (System frame number) is sent which is used in order to share the same timing reference between the UE and the NodeB. The P-CCPCH is always sent using the same scrambling code as the P-CPICH (primary common pilot channel) which is the primary scrambling code of the cell. The spreading code that is used by the P-CCPCH remains a fixed SF (spreading factor) 256 and the number remains equal to 1 as defined in 3GPP TS 25.213: Spreading and modulation (FDD), V6.0.0(ftp://ftp.3gpp.org/Specs/2004-03/Rel-6/25_series/25213-600.zip). The UE knows about the primary scrambling code either by information sent from the network on system information of neighbouring cells that the UE has read, by messages that the UE has received on the DCCH channel, or by searching for the P-CPICH, which is sent using the fixed SF 256, the spreading code number 0 and which transmits a fixed pattern.

The system information comprises information on neighbouring cells, configuration of the RACH and FACH transport channels, and the configuration of MICH and MCCH which are channels that are dedicated channels for the MBMS service.

Each time the UE is changing the cell, it is camping (in idle mode) or when the UE has selected the cell (in CELL_FACH, CELL_PCH or URA_PCH states), the UE verifies that it has valid system information. The system information is organized in SIBs (system information blocks), a MIB (Master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and have to be reread if the time of the last reading of the SIB is bigger than this timer value. SIBS linked to a value tag are only valid if they have the same value tag as the one broadcast in the MIB. Each block has an area scope of validity (Cell, Public Land Mobile Network (PLMN) or equivalent PLMN areas) which signifies on which cells the SIB is valid. A SIB with area scope Cell is valid only for the cell in which it has been read. A SIB with area scope PLMN is valid in the whole PLMN and a SIB with the area scope equivalent PLMN is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on the neighbouring cells on the same frequency, different frequencies and different RAT (Radio access technologies). This allows the UE to know which cells are candidate for cell reselection.

As mentioned previously, MBMS data can be split in two categories: control plane information and user plane information. The control plane information notably contains information on:

Physical layer configuration;
Transport channel configuration;
Radio bearer configuration;
Ongoing services;
Counting information;
Scheduling information.

In order to allow UEs to receive this information, MBMS bearer specific control information for MBMS is sent.

The user plane data of MBMS bearers can be mapped onto dedicated transport channels for a point-to-point service which is sent only to one UE or on a shared transport channel for point to multipoint service which is transmitted to (received by) several users at the same time.

Point-to-point transmission is used to transfer MBMS specific control/user plane information as well as dedicated control/user plane information between the network and a single UE in RRC Connected Mode. It is used only for the multicast mode of MBMS. For a UE in CELL_FACH or Cell_DCH states, DTCH is used, allowing all existing mappings to transport channels.

Point-to-multipoint transmission (PtM) is used to transfer MBMS specific control/user plane information between the network and several UEs in RRC Connected or Idle Mode. It is used for broadcast or multicast mode of MBMS.

The MBMS point-to-multipoint Control Channel (MCCH) logical channel is used for a PtM downlink transmission of control plane information between network and UEs in RRC Connected or Idle Mode. The control plane information on MCCH is MBMS specific and is sent to UEs in a cell with an activated MBMS service. MCCH can be sent in S-CCPCH carrying the DCCH of the UEs in CELL_FACH state, or in standalone S-CCPCH, or in the same S-CCPCH with MTCH.

The MCCH is always mapped to one specific FACH in the S-CCPCH as indicated on the BCCH. In case of soft combining, the MCCH is mapped to a different S-CCPCH (CCTrCH in Time Division Duplexing (TDD)) than MTCH. Reception of paging has priority over reception of MCCH for Idle mode and URA/CELL_PCH UEs.

The configuration of the MCCH (modification period, repetition period etc.) is configured in the system information sent on the BCCH channel.

The MBMS point-to-multipoint Traffic Channel (MTCH) logical channel is used for a PtM downlink transmission of user plane information between network and UEs in RRC Connected or Idle Mode. The user plane information on MTCH is MBMS Service specific and is sent to UEs in a cell with an activated MBMS service. The MTCH is always mapped to one specific FACH in the S-CCPCH as indicated on the MCCH.

The MBMS point-to-multipoint Scheduling Channel (MSCH) logical channel is used for a PtM downlink transmission of MBMS service transmission schedule between network and UEs in RRC Connected or Idle Mode. The control plane information on MSCH is MBMS service and S-CCPCH specific and is sent to UEs in a cell receiving MTCH. One MSCH is sent in each S-CCPCH carrying the MTCH.

The MSCH is mapped to one specific FACH in the S-CCPCH, as indicated on the MCCH. Due to different error requirements the MSCH is mapped to a different FACH than MTCH.

Figure 6:
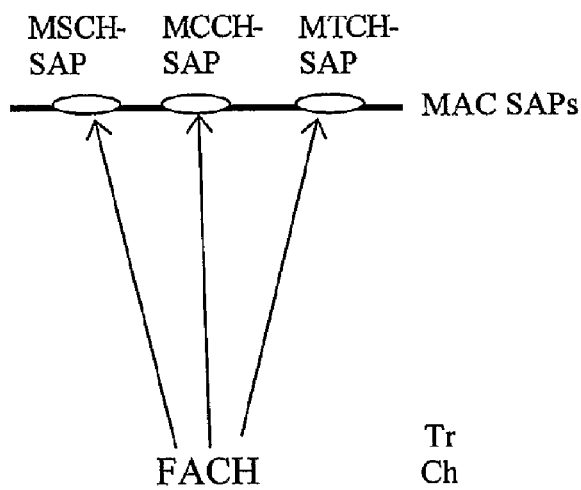
FIG. 6 illustrates the mapping of MBMS logical channels onto FACH transport channel in the mobile terminal.
Figure 7:
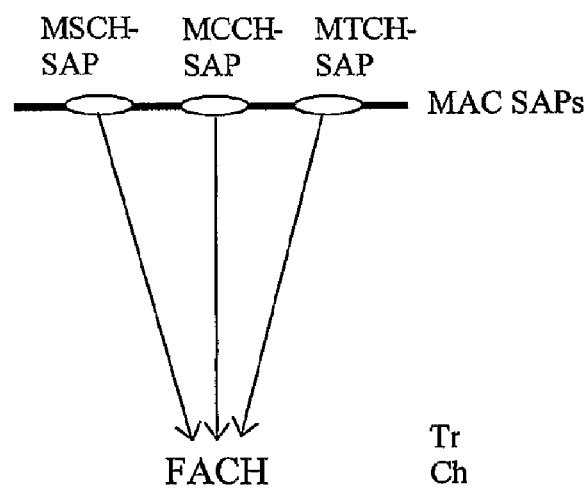
FIG. 7 illustrates the mapping of MBMS logical channels onto FACH transport channel in the network.

FACH is used as a transport channel for MTCH, MSCH and MCCH. S-CCPCH is used as physical channel for FACH carrying MTCH, MCCH or MSCH. As shown in FIGS. 6 and 7 (respectively from the UE and UTRAN sides), for the downlink, the following connections between logical channels and transport channels exist: MCCH, MTCH and MSCH can be mapped to FACH.

Data Flows through layer 2 will now be described. The data flow for MCCH mapped to FACH uses the UM-RLC mode, with required enhancements to support out of sequence SDU delivery. A MAC header is used for logical channel type identification. The data flow for MTCH mapped to FACH uses the UM-RLC mode, with required enhancements to support selective combining. Quick repeat may be used in RLC-UM. A MAC header is used for logical channel type identification and MBMS service identification. The data flow for MSCH mapped to FACH uses the UM-RLC mode. A MAC header is used for logical channel type identification.

MBMS notification utilizes a new MBMS specific PICH called MBMS Notification Indicator Channel (MICH) in cell. The exact coding is defined in Stage-3 physical layer specifications.

The MCCH information is transmitted based on a fixed schedule. This schedule will identify the TTI (Transmission Time interval, i.e. multiple of frames) containing the beginning of the MCCH information. The transmission of this information can take a variable number of TTIs and the UTRAN should transmit MCCH information in consecutive TTIs. The UE will keep receiving the S-CCPCH until:

It receives all of the MCCH information, or
It receives a TTI that does not include any MCCH data, or
The information contents indicate that further reception is not required (e.g. no modification to the desired service information).

Based on this behaviour, the UTRAN can repeat the MCCH information following a scheduled transmission in order to improve reliability. The MCCH schedule is common for all services.

The entire MCCH information is transmitted periodically based on a repetition period. The modification period is defined as an integer multiple of the repetition period. The MBMS ACCESS INFORMATION may be transmitted periodically based on an access information period. This period will be an integer divider of the repetition period. The values for the repetition and modification periods are given in the system information of the cell in which MBMS is sent.

MCCH information is split into critical and non-critical information. The critical information is made up of the MBMS NEIGHBOURING CELL INFORMATION, MBMS SERVICE INFORMATION and MBMS RADIO BEARER INFORMATION. The non-critical information corresponds to the MBMS ACCESS INFORMATION. Changes to critical information will only be applied at the first MCCH transmission of a modification period and in the beginning of each modification period. UTRAN transmits the MBMS CHANGE INFORMATION including MBMS services identifications whose MCCH information is modified at that modification period. MBMS CHANGE INFORMATION is repeated at least once in each repetition period of that modification period. Changes to non-critical information could take place at any time.

Figure 8:
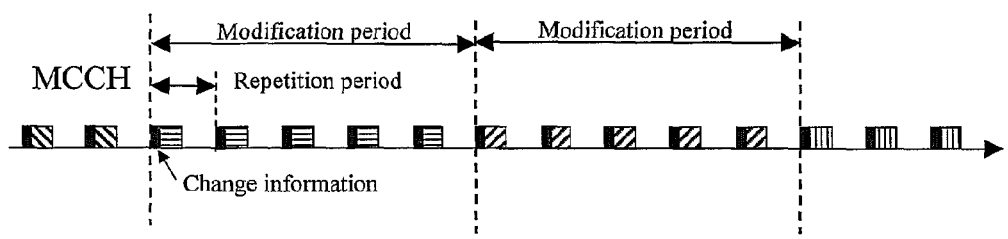
FIG. 8 illustrates a schedule with which the MBMS Modified services Information and the remaining information sent on MCCH are transmitted.

FIG. 8 illustrates the schedule with which the MBMS SERVICE INFORMATION and RADIO BEARER INFORMATION is transmitted. Different patterns indicate potentially different MCCH content.

Figure 9:
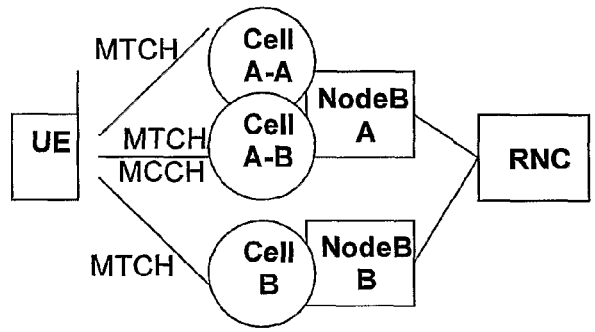
FIG. 9 illustrates a UE receiving MBMS from several cells.
Figure 10:
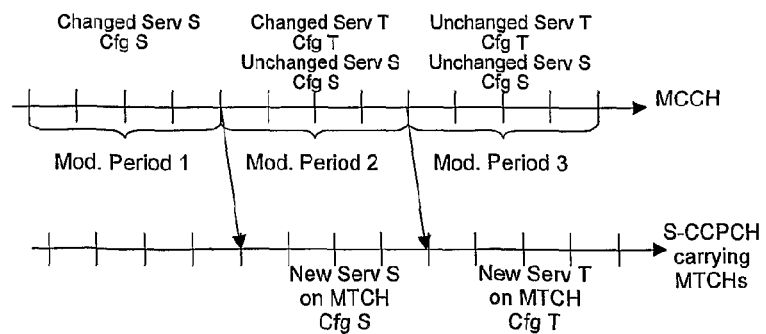
FIG. 10 illustrates a service start in a control cell, according to the background art.
Figure 11:
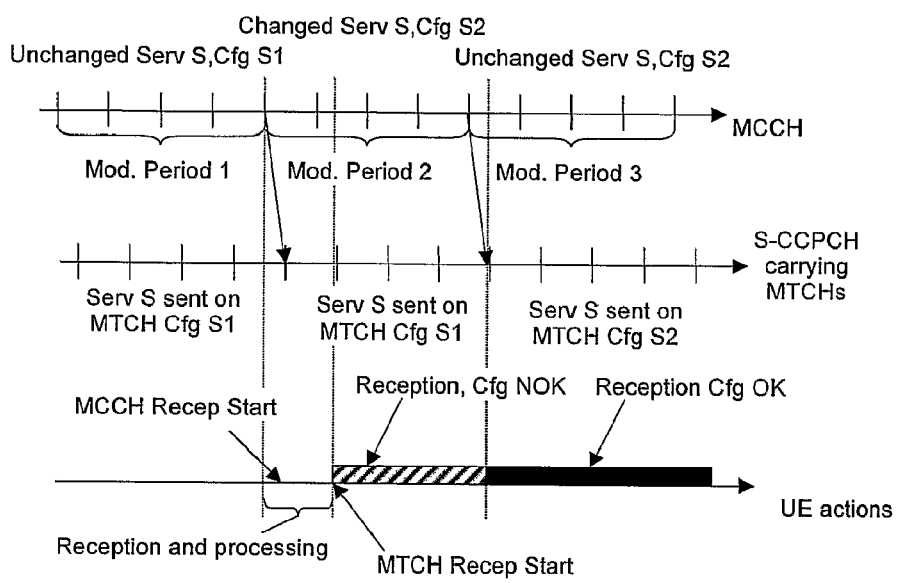
FIG. 11 illustrates a PtM reconfiguration in a control cell, according to the background art.
Figure 12:
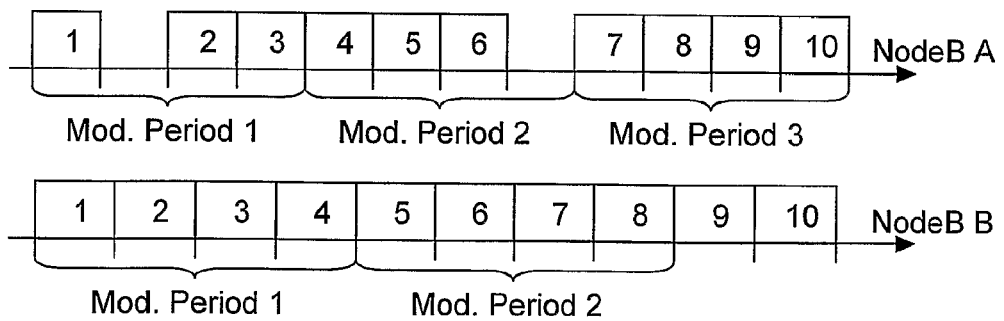
FIG. 12 illustrates a resynchronization of the MTCHs of neighboring cells by insertion of blank TTIs.

In order to increase the coverage, a UE which is located between different cells can receive the same MBMS services from different cells at the same time, and combine the received information as shown in FIG. 9. In this case, the UE reads the MCCH from one control cell that it has selected based on a certain algorithm.

On this MCCH from the selected cell (e.g. A-B), in the figure, the UE receives information on a service that the UE is interested in. This information contains the information on the configuration of the physical channels, the transport channels, the RLC configuration, the PDCP configuration etc in the control cell, and on the neighbouring cells that the UE might be able to receive (e.g. cell A-A and cell B). In other words, the information refers to what the UE needs in order to receive the MTCH carrying the service that the UE is interested in cell A-A, A-B and B.

When the same service is transported on different cells, the UE may or may not be able to combine the service from the different cells at different levels:

No combining possible,
Selective combining at RLC level,
L1 combining at physical level.

The selective combining for MBMS PtM transmission is supported by RLC PDU numbering. Therefore, the selective combining in the UE is possible from cells providing similar MBMS RB bit rate, provided that the de-synchronization between MBMS PtM transmission streams does not exceed the RLC re-ordering capability of the UE. Thus, there exists one RLC entity in the UE side. For selective combining there exists one RLC entity per MBMS service utilizing PtM transmission in the cell group of the CRNC. All cells in the cell group are under the same CRNC. In case desynchronization occurs between MBMS transmissions in neighbouring cells belonging to an MBMS cell group, the CRNC may perform re-synchronization actions enabling UEs to perform the selective combining between these cells.

For TDD, selective combining and soft combining can be used when Node-Bs are synchronised. For FDD, soft combining can be used when Node-Bs are synchronized inside the UE soft combining reception window, and the data fields of the soft combined S-CCPCHs are identical during soft combining moments.

When selective or soft combining is available between cells, the UTRAN sends MBMS NEIGHBOURING CELL INFORMATION containing the MTCH configuration of the neighbouring cells, available for selective or soft combining. When partial soft combining is applied, the MBMS NEIGHBOURING CELL INFORMATION contains the L1-combining schedule, which indicates the time moments when the UE may soft combine the S-CCPCH transmitted in neighbouring cells with the S-CCPCH transmitted in the serving cell. With MBMS NEIGHBOURING CELL INFORMATION the UE is able to receive MTCH transmission from neighbouring cell without reception of the MCCH of these neighbouring cells.

The UE determines the neighbouring cell suitable for selective or soft combining based on a threshold (e.g. measured CPICH Ec/No) and the presence of MBMS NEIGHBOURING CELL INFORMATION of that neighbour cell.

The possibility of performing selective or soft combining is signalled to the UE.

The invention proposes to transmit a message including validity information through a control cell to the UE. The UE may use this validity information to derive the validity timing of the configuration information of the physical channels of the control cell and of the neighbouring cell. Alternately, the configuration validity timing may be derived by the UE based on predefined configuration validity rules, used both by the cells and the network.

Figure 13:
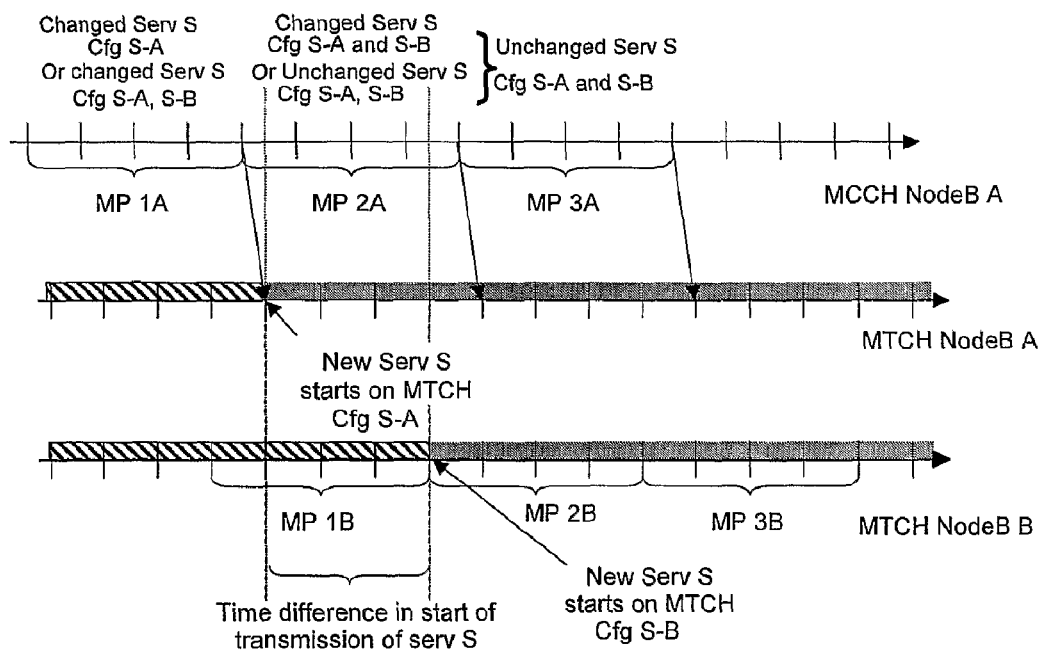
FIG. 13 illustrates a service session start in neighbouring cells.

FIG. 13 illustrates a session start in neighbouring cells. In FIG. 13, the service starts simultaneously in two neighbouring cells. However, due to the non alignment of the modification periods between the cells A and B, the configuration of the service S used in NodeB A (configuration S-A) and in the NodeB B (configuration S-B) is not broadcast at the same time.

When the control cell is NodeB A, no known solution indicates when the configuration of the MTCH of the NodeB B is valid. Indicating the configuration S-B in the modification period 1A is not possible since the UE cannot listen to a channel that is not yet configured and thus, the reception will not be possible. The transmission of the configuration of the service S on the NodeB B is delayed until the modification period 2A, where the configuration of NodeB B is received by UEs listening to the MCCH of NodeB A. This delays the start of the transmission by half a modification period in average.

In the case of a reconfiguration of a service sent on different NodeBs, in addition to the problem of UEs entering a cell, the same problems as in the case of the session start exists: a UE entering the cell where the new configuration is broadcast for the first time will not be able to receive the ongoing session.

In addition, the known signalling is problematic for the UEs that are already receiving the ongoing service on the cell they are camping on and on neighbouring cells. If the modification periods of the NodeB A and of the NodeB B are not aligned, such a signalling does not indicate the correct configuration of the MTCH of the neighbouring NodeB B by the current NodeB A at a given instant.

The determination of a correct configuration for the MTCH of the neighbouring cells at a given time moment is problematic. In the case the synchronisation needs to be maintained, a derivable solution would be to update the system information in order to change the offset of the modification period. This procedure is heavy (burdensome) and would imply that all UEs in the cell wake up and re-read the system information.

Figure 14:
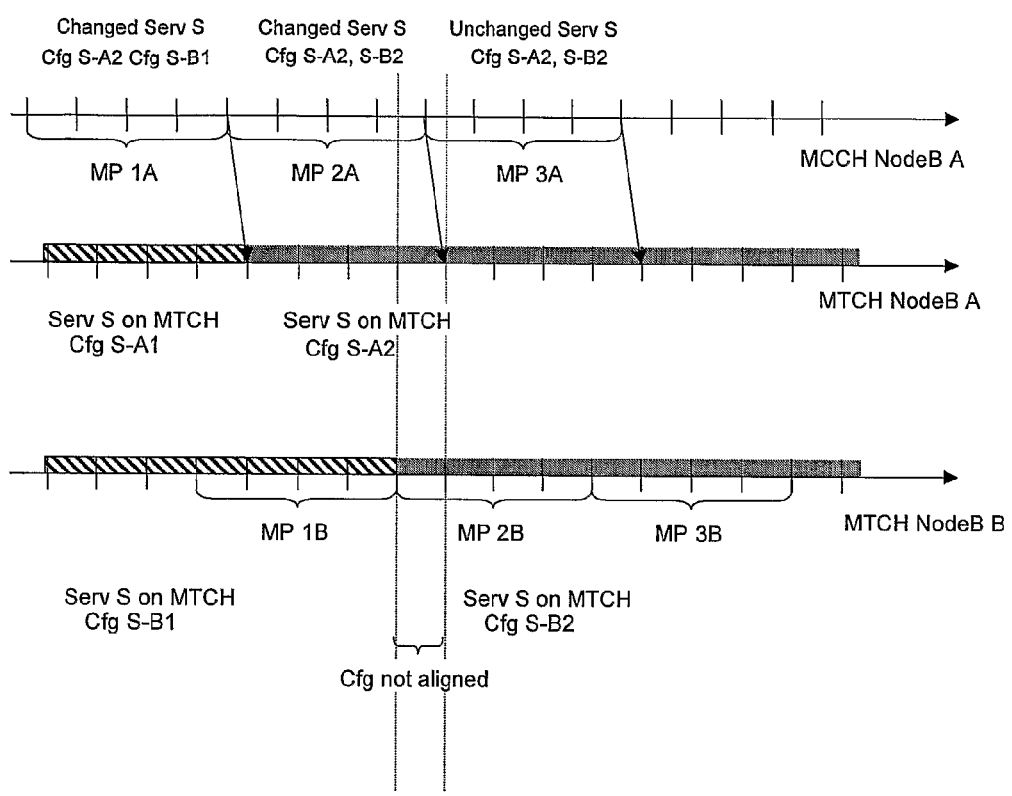
FIGS. 14 and 15 illustrate examples of changes of configuration in neighbouring cells.

A first case of reconfiguration of a neighbouring cell is illustrated in the example at FIG. 14. The configuration S-A2 is sent in the modification period 1A on the NodeB A (since the configuration will change in the control cell NodeB A). For the neighbouring cell, the configuration S-B1 is sent by the MCCH of NodeB A during the modification period 1A. In this case, the UE supposes that the configuration of the service S is not changed during the next modification period.

Without further information, since the modification periods of the NodeB B and of the NodeB A are not aligned, and since changes can only occur at borders of modification periods, the UE would use the wrong configuration.

Figure 15:
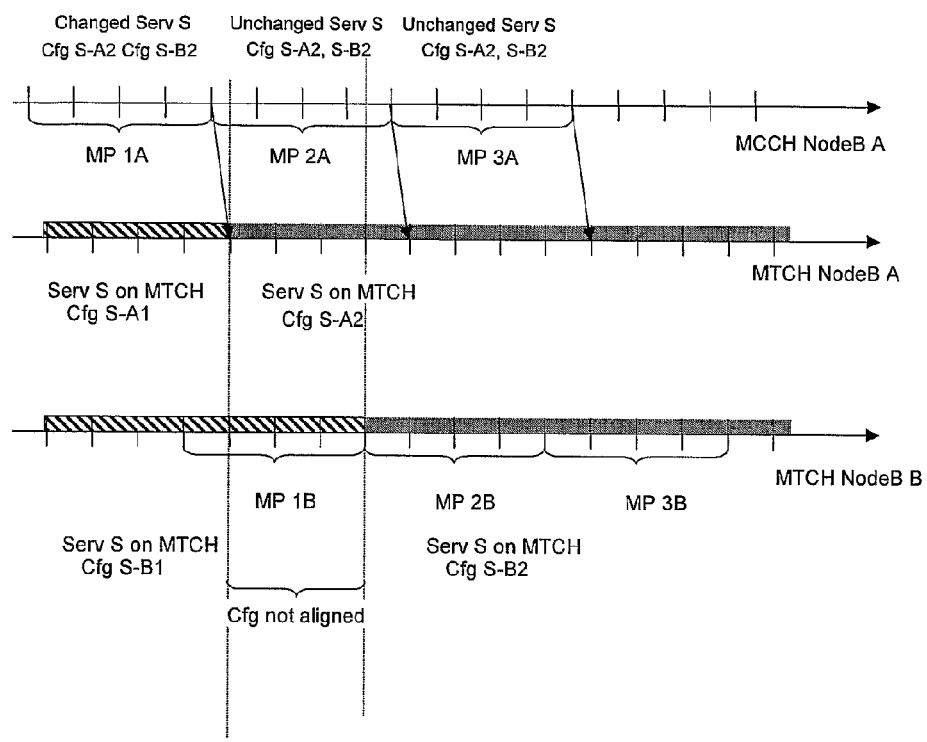

In the example illustrated at FIG. 15, another case of reconfiguration of a neighbouring cell is shown. The configuration S-A2 is sent in the modification period 1A on the NodeB A (since the configuration will change in the control cell). For the neighbouring cell, the configuration S-B2 is sent during the modification period 2A of the NodeB A. In this case, the UE may suppose that the configuration of the MTCH is changed during the next modification period.

Without further information, since the modification periods of the NodeB B are not aligned, and since changes can only occur at borders of modification periods, the UE would use the wrong configuration during the time indicated in FIG. 15.

To overcome the problem of the service reconfiguration timing for a user equipment receiving a MBMS service from neighbouring cells, the invention proposes to indicate the validity of the physical channels carrying point-to-multipoint service data in a wireless communication system by the control cell and the neighbouring cell in the following way. A message comprising configuration information for each of said channels is generated by the control cell. This message includes validity information which can be used by the UE to derive the validity timing of the configuration for each of said channels. The message is then transmitted to a UE.

This information allows the UE to derive a configuration validity timing for a given service transmitted by the neighbouring cells. The right configuration of the service transmitted by the neighbouring cells may then be used by the UE with a limited offset.

The validity timing information may indicate whether a configuration for a physical channel, such as an SCCPCH, carrying MEMS services is valid during a current modification period or longer, after a given activation time, or up to a given activation time. Thus, the problem of a mobile terminal trying to use an invalid physical channel configuration from one of the neighbouring cell is avoided. As such, the validity timing may also be referred to as a timing indication.

Namely, the present invention provides a method for receiving a point-to-multipoint service, comprising: receiving a point-to-multipoint service related control message during a current period; determining whether timing indication exists or not in the received control message; and if timing indication does not exist, performing configuration of a physical channel for receiving point-to-multipoint service data at a next period, whereby information for performing the configuration is included in the received control message, if timing indication exists, performing configuration of a physical channel for receiving point-to-multipoint service data according to the timing indication, whereby information for performing the configuration is included in the received control message.

Also, the present invention provides a method for providing a point-to-multipoint service, comprising: generating a point-to-multipoint service related control message based upon a validity of a physical channel, the control message includes information for performing configuration of the physical channel and optionally includes timing indication; sending the control message during a current period to allow a mobile terminal to perform configuration of the physical channel at a next period or according to the timing indication; and transmitting point-to-multipoint service data to the mobile terminal via the configured physical channel.

Here, the timing indication may comprises a system frame number that indicates the start of the frame at which point-to-multipoint radio bearer reconfiguration is to be performed. Or the timing indication may comprise the least significant bits of the system frame number (SFN) that indicates the start of the frame at which point-to-multipoint radio bearer reconfiguration is to be performed. Or the timing indication may comprise the number of frames or transmission time intervals after the end of the current period that indicates the start of the frame at which point-to-multipoint radio bearer reconfiguration is to be performed.

Alternatively, the timing indication may refer to a multimedia broadcast multicast service (MBMS) point-to-multipoint (p-t-m) activation time. The MBMS p-t-m activation time is an Information Element (IE) comprised of the 11 least significant bits (LSB) of the SFN. Here, the MBMS p-t-m activation time indicates the start of the 10 ms frame corresponding to the indicated SFN value and of the primary CCPCH of the cell where this IE is transmitted. Also, the range of the MBMS p-t-m activation time is from 10 ms after the beginning of the MCCH modification period wherein it is transmitted and to the end of next following MCCH modification period. The UE shall consider a value out of this range as expired.

In the present invention method, the steps may be performed when combining data from a current cell and one or more neighboring cells. Here, the step of combining data may comprise selective combining and soft combining. The steps may be performed when a point-to-multipoint service starts in the current cell. The steps may be performed when a reconfiguration of a point-to-multipoint service in the current cell occurs. The steps may be performed when a session start in neighboring cells occurs. The steps may be performed when a reconfiguration in neighboring cells occurs. The current period and the next period may be modification periods. The start of each modification period may indicate that control information for the point-to-multipoint service is modified. During each modification period, control information for the point-to-multipoint service may be repeatedly received. The control message may be received via a point-to-multipoint control channel. The physical channel may be a Secondary Common Control Physical Channel.

Preferably, a currently valid configuration for a neighbouring cell is transmitted and the validity information indicates to the mobile terminal that this configuration is valid during a current modification period. Thus, when the validity information is received during the current modification period, the mobile terminal is informed that the SCCPCH configuration is currently valid on the corresponding MTCH and may be used upon reading the configuration information. Alternatively, the validity information may indicate to the mobile terminal that the configuration information for a neighbouring cell is valid either after a given activation time or until a given activation time. Accordingly, once having read the validity information, the mobile terminal knows exactly how long to receive the MTCH using the corresponding configuration information.

Additionally, two configurations may be transmitted for a given service and the corresponding cell during a same modification period in case the configuration is modified: the currently valid configuration and the next valid configuration to be used after the reconfiguration. Flags may indicate which configuration is currently valid and which configuration will become valid.

This configuration validity timing information may be linked to the start or to the end of a modification period during which the configuration is received. This validity timing information may be linked to the modification period of the control cell or from its neighbouring cell. The right modification period may either be derived by the UE from the validity information based on predefined rules or by an additional transmission to the UE by the RNC on MCCH of the control cell.

The information for deriving the validity timing may also be an indication of a given modification period, during which the configuration validity starts. This information may also include an offset, for example a number defining a frame or TTI count. The configuration validity then starts at the offset timing after the beginning of the defined modification period.

The information from which the validity timing of the configurations is derived, may be a reference to a SFN timing, starting from which the configurations will be valid. The message generated by a given cell may include a validity reference to the SFN timing of each of the neighbouring cells. The information may also include some of the least significant bits of the SFN timing of a given cell, so that the validity timing may start at an intermediate portion of the SFN timing.

Validity timing information may be carried on the MCCH logical channel of the control cell. Validity timing information may be included in control messages like a MBMS Modified services Information message or a MBMS Unmodified services Information message transmitted on the MCCH logical channel.

Otherwise, a special signalling may be transmitted to the UE to provide it with information indicating that there was no reconfiguration in the former modification period if the service is listed in a message MBMS Unmodified Services information. In this case, the configuration received during the current modification period can be used immediately, for instance at the beginning of the next frame or TTI of the MTCH of the neighbouring cells.

In the case the service is listed in a MBMS Modified services Information message, a currently valid configuration for the associated cell may also be sent, so that a UE just entering this neighbouring cell can determine that it can start receiving the service provided by this cell immediately using this valid configuration. The start may be synchronised with the beginning of the next frame or TTI of the MTCH of this neighbouring cell.

Information may also be provided for the SCCPCH of each neighbouring cell, indicating whether the configuration has changed or not. This information may be detailed for each service and/or for each neighbouring cell.

The use of the MBMS control messages may be the following:

The MBMS Modified Services Information message may comprise an element named MBMS PtM Activation time defining a timing starting from which a new service configuration is valid.

For the control cell, the UE reads the MBMS Modified Services Information (MMSI) message during the modification period of its reception and checks whether a given service is listed in the message. If said service is listed in the MMSI message, the corresponding configuration of the control cell broadcast for this service on MCCH will only be used starting from the next modification period. The UE will then use a formerly received configuration until the beginning of the next modification period. The UE also reads the MBMS Unmodified Services Information (MUSI) message during the modification period of its reception. If said service is listed in the MUSI message, the corresponding configuration will be considered valid and the UE can start the reception of the control cell MTCH as soon as the UE has received all necessary information.

Then, if a UE moves or is switched on in a cell in which a reconfiguration is ongoing, if it has not formerly received the configuration, it shall not start the service reception on the control cell if this service is listed in the MMSI message.

To overcome this problem, the currently valid configuration may also be transmitted and flagged as currently valid. The currently valid configuration can then be used immediately for the control cell service reception.

If a service is listed in the MMSI message because it is changed in a neighbouring cell, if this service is not modified in the control cell, the UE may read information indicating that the control cell configuration is valid and may then immediately use this configuration for the control cell. This information may be an indicator specifying each valid or modified configuration and may be inserted at the message level of the control cell or at the SCCPCH level. This may be especially useful in the case where only the MBMS MAC identification is changed.

If the UE uses predefined rules to determine which configuration is valid at the beginning of a modification period, as an exception, the order of the received validity information may be taken into account, in order to determine if a configuration was modified or not. Thus, a valid configuration period may be used by the UE before waiting for the beginning of the next modification period in certain cases. For instance, any configuration sent after a MUSI will be considered as unchanged for this service and will be considered valid at the moment it is read and the UE will start using this configuration immediately, even if this service was listed as modified in a MMSI message.

Figure 16:
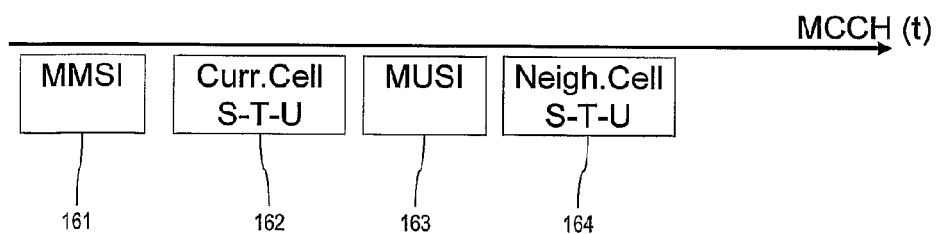
FIG. 16 illustrates a succession of MBMS control messages and their interpretation by the UE according to pre-defined rules.

FIG. 16 illustrates an example of a MCCH message succession for which the exception rules may be applied. For instance, the message 164 defines the configurations of the services S-T-U for the neighbouring cell. This message follows the MUSI message 163. Thus, all the configurations indicated in message 164 are immediately valid for the neighbouring cell, even if configurations of these services for control cell were given in message 162 after the MMSI message 161.

Figure 17:
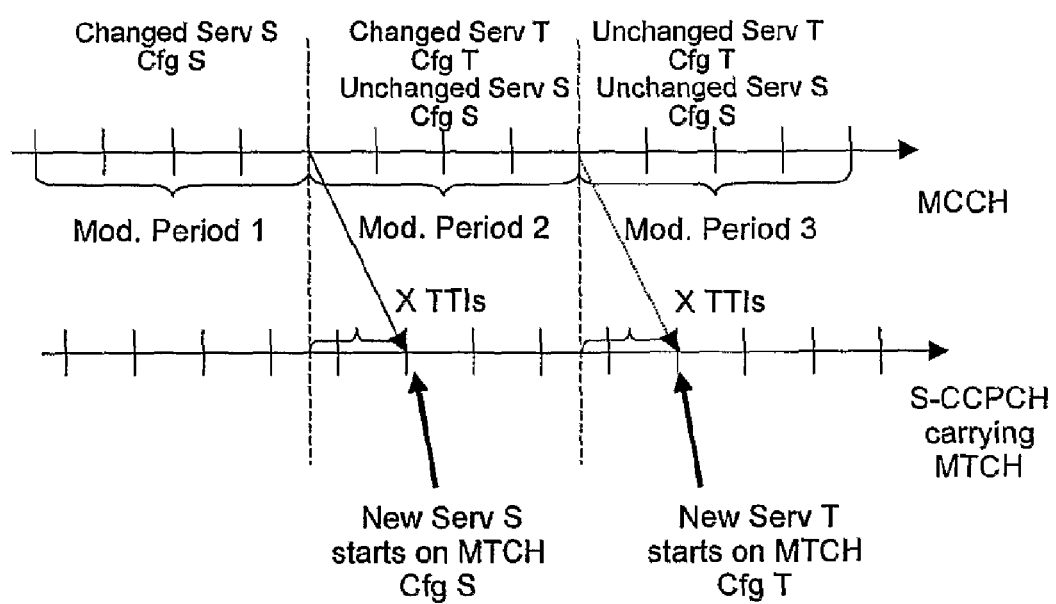
FIG. 17 illustrates a session start with an offset relative to the modification period in the control cell.

FIG. 17 illustrates an example of service start in the control cell. The validity information provided to the UE defines a number of TTIs, a number of frames or a SFN reference defining an offset from the beginning of the control cell modification period. Services S and T on MTCH are started with the given configuration at this time offset after the end of the modification period where the service configuration information was received. This information may be provided on MCCH in the same modification period as the information about the services for which transmission on PtM bearer starts or as general information on system information.

Otherwise, the validity information may indicate whether the configuration of the services on node A is already valid during the current modification period.

Figure 18:
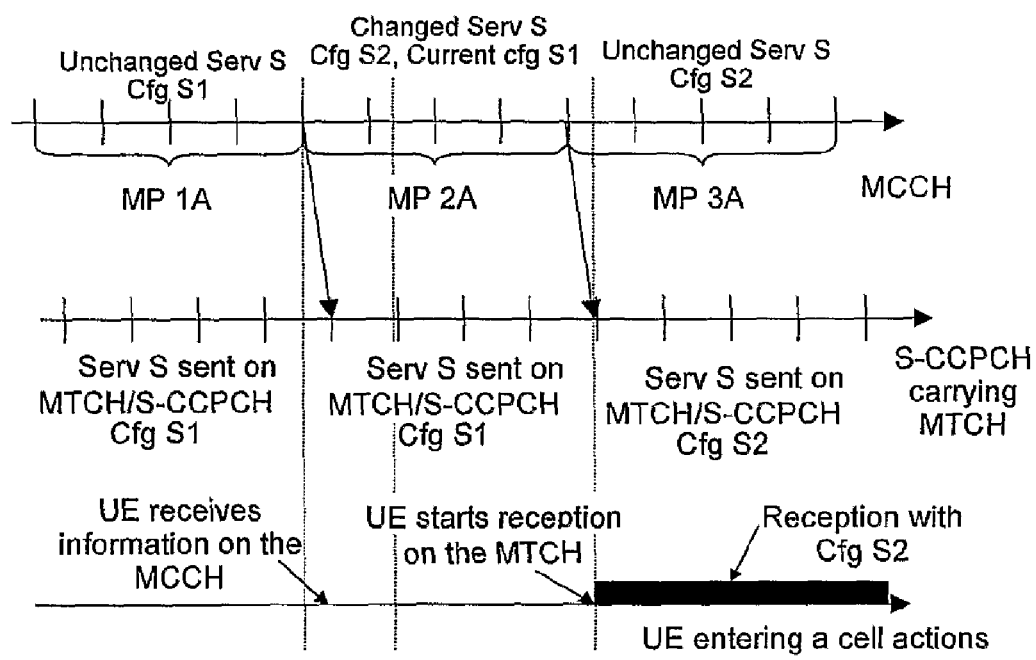
FIG. 18 illustrates a service reconfiguration in the control cell.

FIG. 18 illustrates a control cell service reconfiguration. In the modification period 2A, service S is indicated as a changed service (it is listed in the message MBMS Modified services information for instance), and the new configuration S2 is transmitted (for instance in one of the MBMS Control cell PtM Rb Information, MBMS General Information or MBMS PtM Rb Information message). In order to prevent the UE from using configuration S2 at the wrong timing, validity information define that this configuration S2 shall only be used starting from the next modification period. If the UE had configuration S1 before receiving configuration S2, the validity information may define that the UE has to use this configuration S1 until the end of the current modification period. Configuration S1 is also sent during the modification period 2A, so that a UE entering the control cell may immediately use this configuration without waiting for the beginning of the next modification period. Respective tags identify the currently valid configuration (unchanged configuration) and the next valid configuration (changed configuration).

For the neighbouring cell, the following solutions are proposed.

As illustrated in FIG. 14, if a service is listed in a MMSI message during modification period 1A, the UE uses the modified configuration on the neighbouring cell only in the second modification period 3A after the modification period where the MMSI message was received. The UE uses a formerly received configuration for the transmission on NodeB B until the end of the modification period 1A. The UE stops the reception on NodeB B during the modification period 2A, to avoid any NodeB B configuration error during this period. If said service configuration is listed in the MUSI message during modification period 2A, the configuration on the neighbouring cell is considered valid starting from the next modification period 3A, since there might have been a reconfiguration before.

Another solution is to broadcast the modification periods of MCCH of NodeB B on the MCCH of NodeB A, such that the UE can use NodeB B MTCH configuration changes at the borders of the modification periods of the NodeB B. If a service is listed in the MMSI message during the modification period 1A in FIG. 15, the UE will use the new configuration on the neighbouring cell only from the beginning of the modification period on NodeB B (2B) after the end of the modification period on NodeB A in which the new configuration was received (1A). If said service configuration is listed in the MUSI message during modification period 2A, the neighbouring cell service configuration is considered valid from the beginning of the modification period in NodeB B (2B) during the modification period (2A) in which it has been received in NodeB A, since there might have been a reconfiguration before.

For each neighbouring cell that is reconfigured, the information may indicate an SFN related to the control cell or the neighbouring cell from which or up to which the neighbouring cell reconfiguration is valid. Thus, the beginning or the end of validity of a configuration may be taken into account very accurately.

If a service is listed in the MUSI message during a modification period (for instance 2A in FIG. 15), additional information may be sent to the UE to indicate that there was no reconfiguration in the former modification period, so that the UE may use said service configuration immediately.

If a service is listed in the MMSI message, the currently valid configuration may also be transmitted to the UE, so that it may start receiving the service with this configuration if it enters the corresponding cell.

The validity information may also include a configuration information change indicator for each neighbouring cell and/or service.

The order of the received validity information may also be taken into account, in order to determine if a configuration was modified or not. For instance, any configuration listed in a MUSI will be considered as unchanged for this service and will be considered valid at the moment it is read or at the beginning of the next modification period of NodeB B after the end of the reading modification period in NodeB B or from the second modification period on NodeB A.

The configuration information used by a given service for PtM transmission may notably relate to the following configurations:

S-CCPCH configuration,
Transport channel configuration,
MAC configuration,
PDCP configuration,
RLC configuration.

The present invention provides a method for receiving a point-to-multipoint service, comprising: receiving, from a network, information indicating a validity of a physical channel that carries point-to-multipoint service data; determining an appropriate time for configuring the physical channel based upon the received information; configuring the physical channel according to at least one of the determined timing and a configuration; and receiving the point-to-multipoint service data via the configured physical channel.

The appropriate time may be associated with a timing indication. If the timing indication is included in the information, performing configuration of the physical channel for receiving point-to-multipoint service data according to the timing indication, whereby information for performing the configuration is included in the received control message. If the timing indication is not included in the information, performing configuration of the physical channel for receiving point-to-multipoint service data at a next period, whereby information for performing the configuration is included in the received control message. If the configuration is for unmodified service, performing configuration of the physical channel for receiving point-to-multipoint service immediately.

Also, the present invention provides a method for providing a point-to-multipoint service, comprising: determining a validity of a physical channel that carries point-to-multipoint service data; sending, to a mobile terminal, information indicating the determined validity of the physical channel; and transmitting, to the mobile terminal, the point-to-multipoint service data via the physical channel which was configured with the mobile terminal at an appropriate time derived from the sent information.

The appropriate time may be associated with a timing indication. If the timing indication is included in the information, performing configuration of the physical channel for receiving point-to-multipoint service data according to the timing indication, whereby information for performing the configuration is included in the received control message. If the timing indication is not included in the information, performing configuration of the physical channel for receiving point-to-multipoint service data at a next period, whereby information for performing the configuration is included in the received control message.

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting a validity of physical channels carrying MBMS (Multimedia Broadcast Multicast Service) data in a wireless communication system, the method comprising:
generating an MBMS Modified Service Information (MSI) message comprising validity information for deriving a validity timing of configuration information of the physical channels of at least one cell; and
transmitting the MSI message to a mobile terminal through the at least one cell,
wherein the validity information is based on at least a least significant bit (LSB) of a system frame number (SFN),
wherein the physical channels are Secondary Common Control Physical Channels (SCCPCH),
wherein the validity information is a point-to-multipoint activation time for an MBMS service, and
wherein the validity information defines a starting time at which the configuration information becomes valid.

2. The method of claim 1, wherein the at least one cell comprises a control cell.

3. The method of claim 2, wherein the at least one cell further comprises a neighboring cell.

4. The method of claim 2, wherein the MSI message is transmitted through the control cell.

5. The method of claim 1, wherein the MSI message is transmitted on an MBMS point-to-multipoint Control Channel (MCCH).

6. The method of claim 1, wherein the MSI message defines a modification period at the start of which the configuration information becomes valid.

7. The method of claim 1, wherein the MSI message defines a time offset relative to a beginning of a modification period at the start of which the configuration information becomes valid.

8. The method of claim 7, wherein the MSI message further defines the time offset with a number indicating a number of frames or Transmission Time Intervals (TTIs).

9. The method of claim 1, wherein the validity information comprises currently valid configuration information and next valid configuration information.

10. The method of claim 9, wherein the currently valid configuration information is associated with a beginning of validity timing and the next valid configuration information is associated with an end of validity timing.

11. A method for adapting a configuration of physical channels by a mobile terminal in a wireless communication system, the method comprising:
receiving an MBMS (Multimedia Broadcast Multicast Service) Modified Service Information (MSI) message comprising validity information for deriving a validity timing of configuration information of the physical channels of at least one cell; and
starting to use the configuration of the physical channels based on the validity information,
wherein the validity information is based on at least a least significant bit (LSB) of a system frame number (SFN),
wherein the physical channels are Secondary Common Control Physical Channels (SCCPCH), and
wherein the validity information is a point-to-multipoint activation time for an MBMS service.

12. The method of claim 11, wherein the at least one cell comprises a control cell.

13. The method of claim 12, wherein the at least one cell further comprises a neighboring cell.

14. The method of claim 12, wherein the MSI message is transmitted through the control cell.

15. The method of claim 11, wherein the MSI message is received on an MBMS point-to-multipoint Control Channel (MCCH).

16. The method of claim 11, wherein the MSI message defines a modification period at the start of which the configuration information becomes valid.

17. The method of claim 11, wherein the MSI message defines a time offset relative to a beginning of a modification period at the start of which the configuration information becomes valid.

18. The method of claim 17, wherein the MSI message further defines the time offset with a number indicating a number of frames or Transmission Time Intervals (TTIs).

19. The method of claim 11, wherein the validity information comprises currently valid configuration information and next valid configuration information.

20. The method of claim 19, wherein the currently valid configuration information is associated with a beginning of validity timing and the next valid configuration information is associated with an end of validity timing.

21. A mobile terminal that receives point-to-multipoint service data in a wireless communication system, the mobile terminal comprising:
a reception module configured to receive an MBMS (Multimedia Broadcast Multicast Service) Modified Service Information (MSI) message comprising validity information for deriving a validity timing of configuration information of physical channels of at least one cell; and
a processing module configured to start using the configuration of the physical channels based on the validity information,
wherein the validity information is based on at least a least significant bit (LSB) of a system frame number (SFN),
wherein the physical channels are Secondary Common Control Physical Channels (SCCPCH), and
wherein the validity information is a point-to-multipoint activation time for an MBMS service.

22. A network that provides MBMS (Multimedia Broadcast Multicast Service) data in a wireless communication system, the network comprising:
a processing module configured to generate an MBMS Modified Service Information (MSI) message comprising validity information for deriving a validity timing of configuration information of physical channels of at least one cell; and
a transmission module configured to transmit the MSI message to a mobile terminal through the at least one cell,
wherein the validity information is based on at least a least significant bit (LSB) of a system frame number (SFN),
wherein the physical channels are Secondary Common Control Physical Channels (SCCPCH),
wherein the validity information is a point-to-multipoint activation time for an MBMS service, and
wherein the validity information defines a starting time at which the configuration information becomes valid.

* * * * *